United States Patent [19]

Lemelson

[11] Patent Number: 4,819,101

[45] Date of Patent: Apr. 4, 1989

[54] PORTABLE TELEVISION CAMERA AND RECORDING UNIT

[76] Inventor: Jerome H. Lemelson, 48 Parkside Dr., Princeton, N.J. 08540

[21] Appl. No.: 877,319

[22] Filed: Jun. 23, 1986

Related U.S. Application Data

[63] Continuation of Ser. No. 516,532, Jul. 25, 1983, Pat. No. 4,604,668, and a continuation of Ser. No. 209,057, Nov. 21, 1980, abandoned.

[51] Int. Cl.$^4$ ............................................. H04N 5/783
[52] U.S. Cl. ........................................ 360/10.1; 358/335; 358/906; 360/35.1
[58] Field of Search .................... 360/10.1, 33.1, 35.1, 360/10.2, 10.3, 2; 358/335, 906, 909, 224, 229, 254, 341, 343; 381/43

[56] References Cited

U.S. PATENT DOCUMENTS

| | | | |
|---|---|---|---|
| 2,746,369 | 5/1956 | Beard et al. | 354/82 |
| 2,998,495 | 8/1961 | Maxey | 179/100.2 |
| 3,051,777 | 8/1962 | Lemelson | 178/6.6 |
| 3,397,783 | 8/1968 | Pearce | 210/77 |
| 3,404,241 | 10/1968 | Streets et al. | 179/100.2 |
| 3,742,143 | 6/1973 | Awipi | 381/43 |
| 3,803,350 | 4/1974 | Lemelson | 178/6 |
| 3,818,500 | 6/1974 | Lemelson | 360/2 |
| 3,833,758 | 9/1974 | Ferrari | 178/6.8 |
| 3,842,199 | 10/1974 | Gibson | 178/6.8 |
| 3,943,563 | 3/1976 | Lemelson | 360/35 |
| 3,962,725 | 6/1975 | Lemke et al. | 360/36 |
| 4,057,830 | 11/1977 | Adcock | 358/127 |
| 4,057,836 | 11/1977 | Munsey | 358/140 |
| 4,097,893 | 6/1978 | Camras | 358/83 |
| 4,099,202 | 7/1978 | Cavanaugh | 358/85 |
| 4,131,919 | 12/1978 | Lloyd | 358/906 |
| 4,213,163 | 7/1980 | Lemelson | 360/35 |
| 4,232,329 | 11/1980 | Horak | 358/906 |
| 4,262,301 | 4/1981 | Erlichman | 358/906 |
| 4,368,490 | 1/1983 | Takimoto | 358/906 |
| 4,547,815 | 10/1985 | Kimura | 358/906 |
| 4,604,668 | 8/1986 | Lemelson | 360/10.1 |

FOREIGN PATENT DOCUMENTS 5258315 5/1977 Japan .
1440791 6/1976 United Kingdom .
1557608 12/1979 United Kingdom ................ 358/906

OTHER PUBLICATIONS

"Micropower Consumption Handy LSI TV Color Camera for Eng. System", Imai et al., NEC Res. & Devlp., No. 45, Apr. 1977, pp. 72–82.
"A 22-lb., ¼ in. Portable Color Video Camera/-Recorder System", Rody, Journal of the SMPTE, vol. 84, Aug. 1975, pp. 607–609.
"A Portable Color Camera with ½ in. Video Recorder for Electronic Journalism", Groll, Journal of the SMPTE, Aug. 1974, pp. 640–644.
"Marsh Realty Video Set Makes Home Hunting Easy", Journal Messanger (Manassas, VA.) Apr. 10, 1972.

Primary Examiner—Alan Faber
Assistant Examiner—W. R. Young
Attorney, Agent, or Firm—Marvin S. Gittes

[57] ABSTRACT

A portable television camera and recording device is provided for generating, monitoring, and recording still and motion picture information. The device is provided within a single housing permitting the housing to be pointed at an object or scene to be recorded. A television camera or flying spot scanner, a television recorder such as a magnetic tape video recorder, and a visual monitor such as a cathode ray tube are supported within the housing. Manually operable controls such as switches which may be selectively actuated to perform such functions as monitoring and/or recording are provided. The major components of the portable unit, such as the television camera, magnetic tape recorder, monitor and electronic control units, are preferably modular and capable of being removed and replaced without difficulty. In one form, a trigger operated switch may be operated in one of two modes effecting either single frame television signal recording or multiple frame motion picture television signal recording and playback.

22 Claims, 2 Drawing Sheets

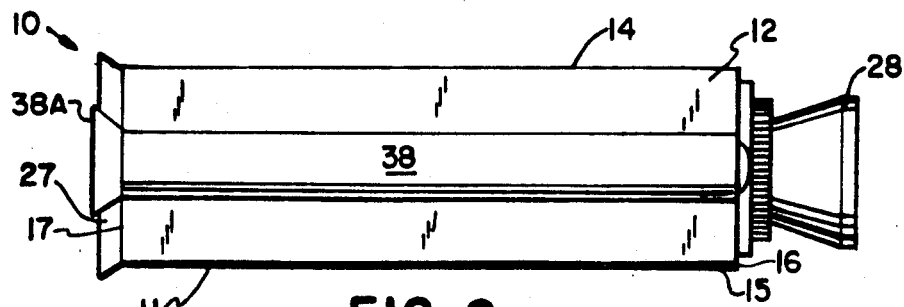
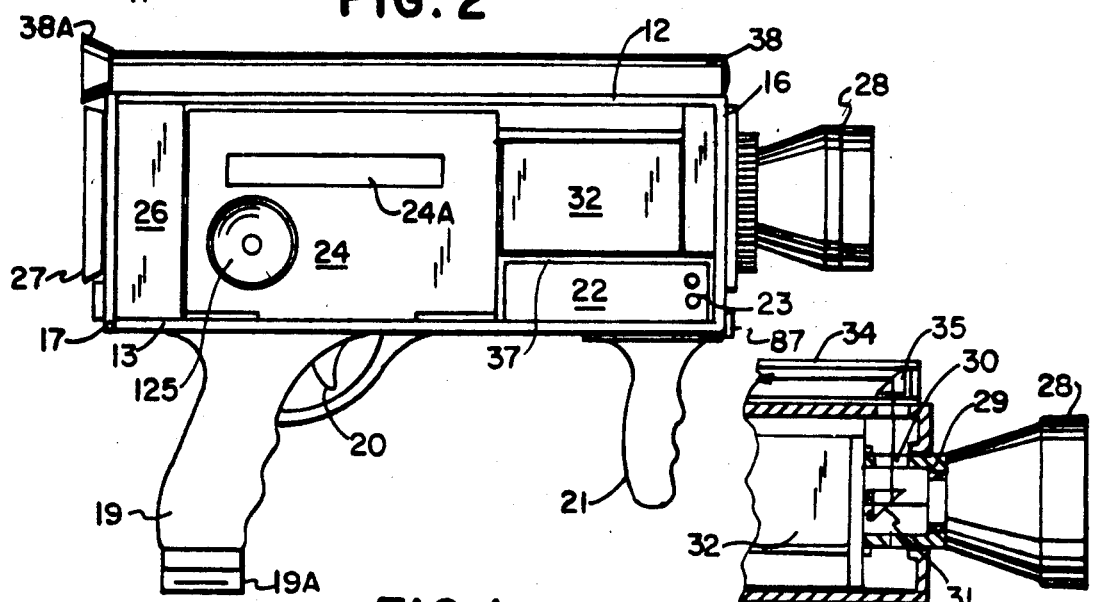
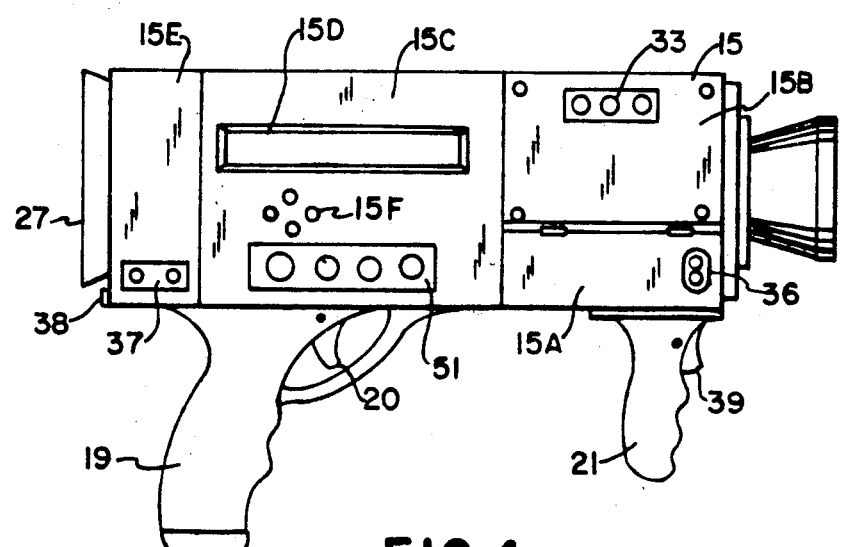

PORTABLE TELEVISION CAMERA AND RECORDING UNIT

RELATED APPLICATIONS

This is a continuation of application Ser.No. 516,532 filed 7/25/83, now U.S. Pat. No. 4,604,668; a continuation of Ser.No. 209,057 filed 11/21/80 now abandoned.

SUMMARY OF THE INVENTION

This invention relates to a portable recording unit containing a television camera, a television signal recorder, a television monitor and manual controls for selectively operating such devices to effect electro-optical scanning of an image field, recording of the image information and monitoring the recorded information. The unit is operable either in a single frame recording mode or a multiple frame or motion picture recording mode whereby either or both types of recording may be effected per se or sequentially with respect to a magnetic recording member, such as a magnetic tape, provided as a recording medium for a recording and playback unit supported within the single housing of the device.

Heretofore, it was known in the art to provide a manually operated portable television camera in one housing, a television tape recorder in another housing located remote from the camera and a battery located in a third housing wherein all three units are interconnected by means of flexible wires. Such an arrangement of components and their connections are quite difficult to handle and operate and are subject to operational breakdown for a number of reasons including the fact that the interconnecting wires may be tensioned during use resulting in disconnections of the couplings between components which may occur when the lines are tensioned.

The instant invention not only provides a unitary portable unit containing a television camera in a single housing, but such unit is so arranged and constructed that the single housing also contains a magnetic tape or card recorder for television signals, a monitor device for viewing the recorded information or the output of the television camera, a battery which may be easily charged while in the housing, and suitable manual controls for properly operating the camera, the recorder and the monitor.

Accordingly, it is a primary object of this invention to provide a new and improved electronic camera apparatus which is capable of electronically recording visual information in the form of still images or motion picture images on a magnetic recording member without the need for photographic film.

Another object is to provide a portable television camera unit which also includes a recorder for the television signal output of the camera.

Another object is to provide a portable television camera and recording unit which may be easily operated to record both still picture information and motion picture information.

Another object is to provide a portable television camera and recorder which may be easily held, aimed and manipulated to effect the recording of television picture signals generated on the output of a television camera.

Another object is to provide a portable television camera and recorder unit having a monitor device for visually monitoring image information before, during or after it is recorded and suitable controls to effect such functions.

Another object is to provide a camera for scanning and recording still picture information and monitoring the information immediately before, during or after it is recorded.

Another object is to provide a television recording unit which is capable of recording both still image and motion picture image information on a single record unit and of selectively reproducing either the still or motion picture information recorded.

Another object is to provide a portable television camera and magnetic tape recorder which employs a magnetic tape supported within a cartridge.

Another object is to provide a control system for a magnetic recorder employing a single switching device for recording either still image or motion picture image information on a single magnetic recording member in accordance with the manner in which the switching device is actuated.

Another object is to provide a method of operating a magnetic tape recorder to permit it to record either still or motion picture information.

With the above and such other objects in view as may hereinafter more fully appear, the invention consists of the novel constructions, combinations and arrangements of parts, as will be more fully described and illustrated in the accompanying drawings, but it is to be understood that changes, variations and modifications may be resorted to which fall within the scope of the invention as claimed.

In the drawings:

FIG. 1 is a side view with a side wall removed of a portable, hand held television camera, recorder and monitor device;

FIG. 2 is a top view of the device of FIG. 1;

FIG. 3 is a side view with parts broken away for clarity of a modified form of the device of FIGS. 1 and 2;

FIG. 4 is a side view of the device of FIG. 1 having certain modifications thereto;

Figure 5:
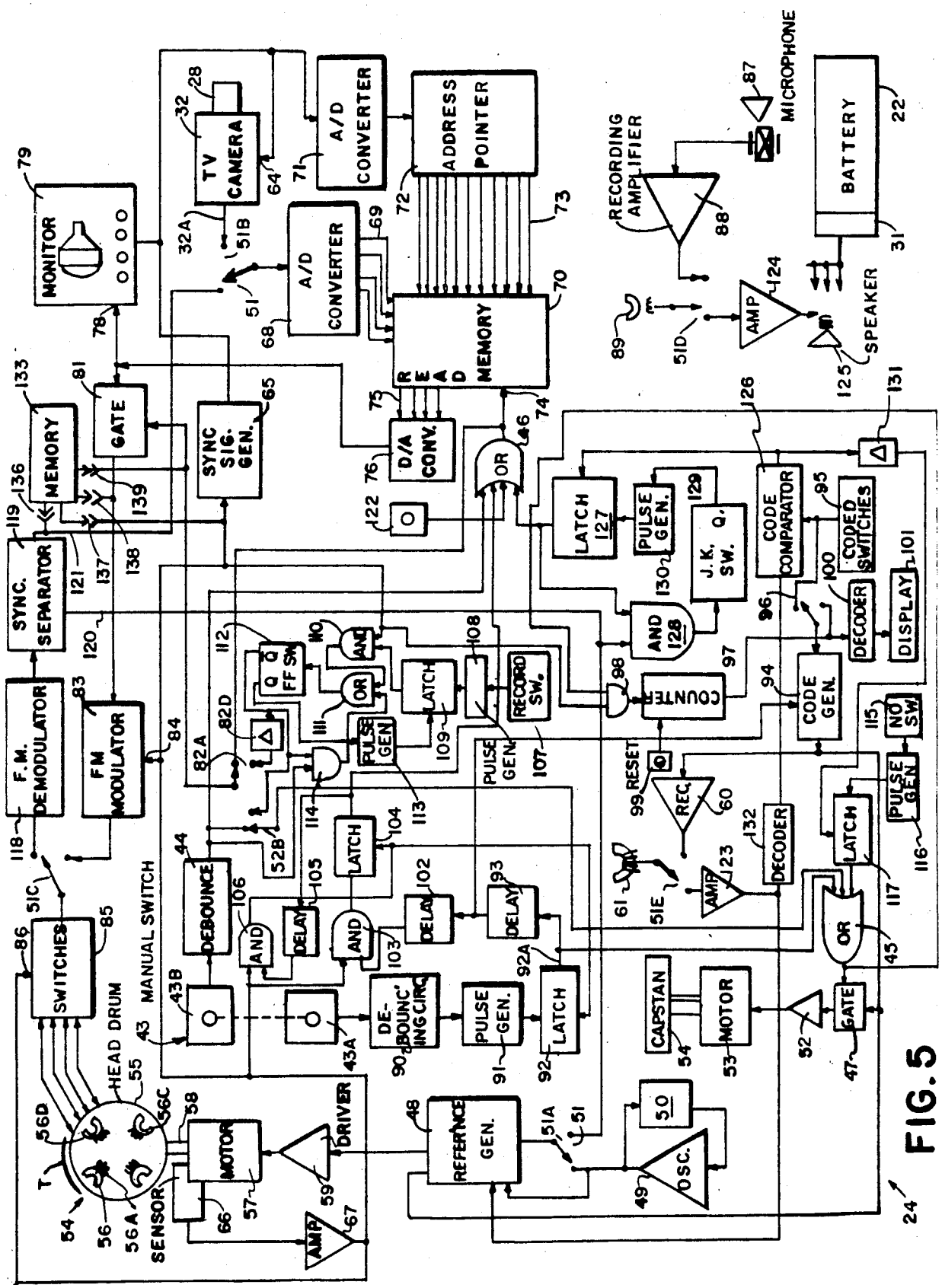
FIG. 5 is a schematic diagram showing components of the camera device of FIGS. 1 and 4 for electrically controlling the operation thereof in a plurality of different modes of operation.

In FIGS. 1 to 4 is shown a portable television camera and recording unit 10 having its major components supported within a single box-shaped housing 11 formed with rigid top and bottom walls 12 and 13, side walls 14 and 15, a front end wall 16 and a rear end wall 17.

Supported at the front end of the housing 11 on a shelf 37 extending between the side walls thereof a distance above the bottom wall 13 is a miniature television camera 32 which may be operated to generate monochrome or color television signals on its output. Supported below the camera 32 is a rechargeable battery 22 having terminals 23 for receiving rechargeable electrical energy from the exterior of the housing and connected by wires (not shown) through suitable switches, to be described, to the energizing input of the camera 32 and the other electronic units supported within the housing 11. Supported directly behind the camera 32 is a television recorder 24, such as a television tape recorder having an elongated opening 24A in its side wall for receiving a cartridge or cassette of magnetic tape. The recorder 24 may be a scaled down version of a conventional so called video cassette recorder containing suitable motor driven mechanisms for either recording directly on magnetic tape while it is supported within the cartridge which is inserted into the opening 24A or on such magnetic tape while a portion thereof is removed and wound around a rotating drum containing one or more magnetic recording and reproduction transducers operable to helically scan transverse tracks of the tape as the tape is driven past the drum. Such mechanisms as provided in video cassette recorders such as the so called Betamax produced by the Sony Corporation of Tokyo, Japan, or similar types of video cassette recorders produced, for example, by Sanyo Company, Matsushita Electric Company, and JVC (Japan Victor Corporation) all of Japan, may be employed in the video recorder 24.

Supported behind the recording unit 24 and having a viewing screen 27 is a miniature television monitor 26 which is operatively connected by wires (not shown) and suitable switches, to be described, to both the outputs of the television camera 32 and the recorder 24. Extending forwardly of the housing 11 and optically coupled to the television camera 32 is a suitable camera lens housing 28 containing the necessary lens or lenses for directing light to the electro-optical input of the camera 32.

The housing 11 contains two handles, a rear handle 19 defining a pistol grip and having pivotally mounted near the upper end thereof a trigger actuator 20 which may be finger pivoted in the counterclockwise direction toward the handle 19 to manually close two sets of contacts, one of which sets defines an override switch which is operated whenthe actuator 20 is lightly depressed for controlling the recording of a single frame of television picture information, while the other is operated when the actuator 20 is totally depressed and is employed to effect motion picture scanning and recording as will be described. A second handle 21 is provided near the front end of the housing 11 to permit the housing to be supported by means of both hands and to provide suitable support therefor so as to permit the trigger actuator 20 and other switches to be described to be operated by the fingers of the hand gripping the pistol grip handle 19. Notation 19A refers to the bottom portion of the handle 19 which may include an electrical coupling device for connecting an external source of electrical energy to the camera in the event that the battery 22 is discharged or is not employed.

Also shown in FIGS. 1 and 2 is an optical system for optically scanning the image information entering the housing 28. Certain details of such optical system are shown in FIG. 3 and include an optical prism 31 which is so arranged as to pass a portion of the entering light upwardly through an opening 30 in a tubular receptacle at the end of the housing 28 and then through a second opening 30 to a second prism 35 which directs the image light pattern along the elongated tubular housing defining unit 38 to a viewing eye piece 38A at the rear end thereof. A portion of the light passed to prism 31 enters the camera 32 where it modulates suitable camera electronics including a read beam containing cathode ray tube or other suitable television scanning means.

In the embodiment illustrated in FIG. 4, the side wall of the housing 11 is in place and is made up of a number of separately removable or pivotable components including a first hinged section 15A which may be pivoted upwardly or removed to permit access to the rechareable battery 22 for replacement or inspection thereof. A female receptacle 36 is mounted on the wall section 15A for receiving a plug extending from a suitable battery charging unit for charging the battery.

A wall section 15B is removably mounted on the housing and contain a panel 33 supporting a plurality of controls for adjustably controlling the television camera 32 to vary such functions as brightness, vertical stability, color circuitry, etc.

A third section 15C of the side wall contains an elongated opening 15D therein permitting a magnetic tape cassette or cartridge to be inserted into the housing 11 and passed into the magnetic tape or reproduction unit 24 through the opening 24A aligned with 15D. A plurality of switches 51 are supported on the side wall of the panel 15C and are employed to control recording and reproduction operations as will be described.

A fourth panel 15E,also removable from the housing 11,forms part of its side wall and covers the monitor unit 27 which may be removed from the housing when the panel 15E is removed. Switches 37 suppoted by the panel 15E may be easily operated to control the operation of monitor 27 supported immediately behind panel section 15E.

Also illustrated in FIG. 4 is a second trigger actuator 39 supported by the front handle 21 which may be employed to operate one of the control switches described hereafter. For example, when actuator 39 is manually squeezed or pivoted, it may be employed to close a switch for effecting the recording of a single frame television picture signal on the magnetic recording member of the recording unit 24. Actuator 20, when depressed, may be employed solely to close a switch for effecting motion picture signal recording on the recording member of the recorder-reproduction unit 24. Either actuator may also be employed to provide for instant playback of recorded information, when manually depressed.

It is noted that the recorder and reproduction unit 24 may also comprise a magnetic card recorder-reproducer device of the types defined in U.S. Pats. Nos. 3,943,563; 3,803,350 or 3,818,500; or of the type manufactured by the Sony Corporation of Tokyo, Japan under the trade name Mavica as described in the November/December/1975 issue of Video Systems Magazine. If such a magnetic card recorder/reproducer unit is employed in the location shown in FIG. 1, the openings 24A and 15D in the side wall of the housing 11 would be narrow enough to accomodate and guide a suitable magnetic card inserted therein by hand into the recorder housing wherein it may be power driven by suitable rollers to an operative location for video signal recording and/or reproduction scanning as described.- Such movement into the recorder housing may be effected automatically when a sensor senses the leading edge of the magnetic card and controls a drive motor, or in response to the operation of a manual control switch located on the side wall of the housing 11. Single and/or motion picture frames of full frame video picture signals may be recorded with locating codes on the face if the magnetic card containing the magnetic recording material.

Also shown in FIG. 1 is a microphone 87 supported at the front end of the housing 11 adjacent the battery 22. The microphone 87 may also be supported on an extendable or folding arm on the outside of the housing for picking up sounds to be recorded along with video motion picture recordings as will be described.A loud speaker 125 is shown supported by the video recorder 24 facing one side of housing 11 and openings 15F are provided in the side wall portion 15C to permit sound from the microphone to be heard exterior of the housing 11.

ELECTRONIC CONTROL SYSTEM

In FIG. 5, the control system 30 for the camera recording unit 10 includes a normally open manually closable switching means 31 which is operated, per se or , when the trigger 20 is manually depressed,which gates power from the battery or power supply 22, which may comprise a rechargeable battery as described, to all active circuits in the system 30 for all modes of operation which will be described. The television tape recording and playback unit 24 may be of the helical tape scanning type employing such constructional details as provided in such U.S. patents as U.S. Pat. Nos. 2,998,495; 3,404,241; 3,397,783; 3,051,777; and 3,803,350.

The magnetic tape or card recording unit 24 receives the television signal or signals generated on the output of camera 32 which signals are converted to frequency modulated signals which are applied to one or more magnetic recording heads denoted by the general notation 56 supported by a rotating drum 55 wherein the rotating heads scan, in a so called helical scanning operation, transverse tracks of a magnetic tape supported within and supplied by a cartridge or cassette inserted into the opening 15D in the side wall of the housing of the portable unit 10. One or more stationary magnetic heads 89 are also provided for recording audio information received from a microphone 87, along one or more audio tracks and one or more stationary pulse or code recording heads 61 are provided to record coding information along a code track or tracks of the magnetic tape or card.

The trigger actuator 20 located adjacent the handle 19 is mechanically connected to a normally open multiple-pole switch 43 which is provided with two switching positions or contact pairs, one of which, denoted 43A, is operable to effect control of the television camera 32 in a manner to cause it to full-frame sweep its image field one complete cycle while attainment of the second switching position or contact closure as defined by section 43B of the switch 43 results in operation of the television camera 32 in a continuous manner to continuously generate and output television picture signals as long as the contacts of switch section 43B are closed.

When the trigger actuator 20 is slightly depressed, the contacts of switch section 43A are closed while the contacts of section 43B remain open. When trigger actuator 20 is firmly depressed, the contacts of switch section 43A are closed which activates a switch debounce circuit 44 energizing an OR gate 45 and a second OR gate 46. OR gate 45 activates a transmission gate 47 passing motor drive signals from a reference generator 48, which is synchronously locked to an oscillator 49 having a crystal feedback means 50 for stability and accuracy, through a single pole double throw switch 51A forming part of a multiple-switch assembly 51 which is employed to effect either a playback or recording operation, said motor drive signals being thereby gated to a motor drive circuit 52 controlling a synchronous motor 53 which drives the tape capstan wheel 54 advancing and driving the magnetic recording tape T past a record playback head assembly 54. The record playback head assembly 54 contains several magnetic record-playback heads denoted 56A, 56B, 56C, 56D, or a single head depending on the manner in which the magnetic recorder is designed and the head or heads are supported by a drum which rotates on a shaft 58 driven by a high speed motor 57 which is synchronized to the output of the reference generator 48 through motor drive circuits 59.

The output of reference generator 48 is also connected to circuitry 60 defining control track recording electronics which controls the motor 57 and the recording of the output signals of the reference signal generator 48 on a control signal recording track of the tape so as to be available, when reproduced therefrom to effect playback synchronization.

The visual or image information signals to be recorded on the tape are derived by the electro-optical scanning means of the television camera 32 as received through the camera lens 28 and are generated as full-frame video picture signals on the output 32A of the camera which signals are intensity modulated in accordance with the brightness features of the image field which is electronically scanned by the read-beam or other scanning means of the camera. The horizontal and vertical synchronization signals which are utilized to control the sweep of the read-beam or flying spot scanner of the camera 32 are applied to the read-beam control input 64, are derived from a sync signal generator 65 and are synchronized to the rotational movement of the magnetic head assembly by means of signals generated by a rotational position sensor 66 which may comprise a photoelectric, electro-mechanical or other form of sensor sensing the rotation of the shaft 58 of the motor 57 driving the drum 55 containing the magnetic transducing head or heads 56. The sensing signals so generated are amplified in an amplifier 67. The full-frame video picture signals generated on the output of the television camera are passed to an analog-to-digital converter 68 through the contacts 51B of the single hole double throw switch 51 described and the output of the converter 68 is presented as a digital code representing the brightness and color value associated with the video signal output of the camera which code signals are passed to the write-inputs 69 of a full-frame memory device 70. The sweep signals generated by sweep signal generator 65 are input to an analog-to-digital converter 71, the output digital signals of which are passed to an address pointer 72, the outputs 73 of which are applied to selectively activate the proper locations of the memory 70 for recording the brightness levels of the digitized video picture signal elements presented on the outputs 69 of the analog-to-digital converter 68 when a write-enable input 74 for the memory 70 is activated.

The memory 70 is continuously swept by the address pointer 72 in synchronization with the movement of the head assembly 55. The signals generated on the read-outputs 75 of the memory 70 thus continuously represent the information content of the memory 70. The output signals are passed to a digital-to-analog converter 76 on the outputs 75 and the output of the converter is generated as analog video signals which are passed to the input 78 of a video monitor 79 such as a cathode ray tube or other form of electronic display for displaying the information recorded in the memory.

The write-enable input 74 of the memory 70 is activated by the output of an OR gate 46 when the contacts of switch section 43B are closed as described.

OR gate 46 also activates a transmission gate 81 when a manually operated single pole double throw switch 82A is closed, passing the video signal generated on the output of the digital-to-analog converter 76 to an F.M. modulator 83 which conditions the video signal for recording by combining it with the sync signal generated on the output of amplifier 67 which is passed to the input 84 of the modulator 83. A manually operable double throw switch 51C is employed to connect the recording heads 56 to the output of the modulator 83 while the output of the amplifier 67 is connected to an input 86 of an electronic switch 85 which is operable to connect the appropriate head 56 of the bank of heads 56A-56D in timed synchronization to the output of the F.M. modulator 83 and the amplifier 67 to effect the proper recording of the video picture signals on respective transverse tracks of the tape as it is driven around the rotating head assembly.

An audio signal of sounds generated in the vicinity of the camera may be recorded in the conventional manner by gating the output of a microphone 87 to a proper recording electronic circuit 88 through a manually operated single pole double throw switch 51D which is connected to an audio record-playback head 89 which is stationarily supported in the recorder to record along an audio track extending parallel to the longitudinal axis of the magnetic tape. The operations described above essentially define recording and playback for the motion picture mode of recording operation of the apparatus 10.

SINGLE FRAME RECORDING

In order to effect single full-frame video picture signal recording of information derived from the television camera the following operational functions are noted. The finger operated trigger actuator 20 for the manually operated switch 43 is slightly depressed which activates the normally open switching section 43A thereof activating a switch debouncing circuit 90 which causes a pulse generator 91, such as a monostable multivibrator, to set the latch 92 of the switch as a result of generating a very short pulse each time switch 43A is so activated. The output of the latch 92 is applied to an input of OR gate 45 resulting in the subsequent controlled operation of the tape drive motor 53 which drives the tape capstan 54 and any other mechanism necessary to effect tape drive movement against or around the head drum as previously described.

The output 92A of the latch 92 becomes energized and the signal so generated is passed to activate a code generator 94 after being delayed by means of a time delay circuit 93 for a sufficient time interval to permit the tape drive motor 53 to start up and attain operating speed. The code generator 94 generates a unique code which is determined either by the manual operation of a bank of coded switches 95, for example by employing thumb wheel BCD switches, such activation occurring when a single pole double throw manual switch 96 is in its manual operational position as shown or when said switch 96 is in its automatic operational position and is connecting a counter circuit 97, which accumulates one count each time the clock is pulsed by AND gate 98 to said code generator 94. The output of the AND gate 98 is activated every time a signal is present on both its inputs, one of which inputs is connected to receive the sync signal generated on the output of amplifier 67 for the motion picture mode of operation and the other to the output of the OR gate 45 which is activated when it is desired to effect video signal recording in either the motion picture or single frame recording modes. The counter 97, which accumulates one count for each frame actually recorded, may be reset by means of a reset switch 99, which may be manually operated and/or automatically operated as a limit switch when engaged by a portion of the housing of the magnetic tape cassette or magnetic card inserted into the housing of the recorder-playback unit.

The output of counter 97 is connectable in addition to the code setting input of the code generator 94, to a decoder-driver circuit 100 through switch 96 to provide a display of the count on a display means 101, such as a light emitting diode, liquid crystal diode, or other form of digital display which is connected to the decoder-driver circuit 100 and which provides a visual indication of the frame number being recorded. The output of the code generator 94 is a digital code signal which is in a form to be immediately recorded by head 61 on the control track of the magnetic tape or card along with the synchronization control signals as described, without interference to the operations effected by means of said control signals.

Time delay circuit 93 also is employed to activate a further time delay circuit 102 providing a time delay which is sufficient for the recording of the code generated just prior to the generation of the full-frame video picture signal which is associated with said code. The time delay circuit 102 has an output which extends to one input of an AND gate 103. The other input to AND gate 103 extends from the output of sync signal amplifier 67. When both inputs to gate 103 are energized, a signal is generated on the output of the gate which sets a latch 104 which, in turn, activates an input of OR gate 46 energizing the enabling circuit 74 for the memory 70 during operation of the unit in the motion picture mode. The latch 104 is also employed to activate a time delay circuit 105 having a delay which is slightly longer than the duration of the sync pulse derived from the amplifier 67. Delay circuit 105 is connected to one input of an AND gate 106. The other input to AND gate 106 is derived from the output of sync amplifier 67. When the AND gate 106 becomes energized, it passes a signal on its output which is generated after the first sync pulse indicating the beginning of the next recorded frame and thereafter generates a second sync pulse indicating the end of the recording frame, which second signal serves as a reset signal to reset both latches 92 and 104 thereby conditioning the system to properly effect the recording of the next frame and deactivating the OR gate 46 and the enabling input 74 to the memory so as to hold the frame information just generated within the memory 70 until the next frame is presented thereto or, in the single frame recording monitoring mode, until the energizing power to the memory is removed or deactivated.

Provision is also made in the control system illustrated in FIG. 5 to permit the video information generated by the television camera to be previewed on the viewing screen of the monitor before recording such information in the magnetic recorder 24. To effect such previewing, manual switch 82A is operated in a manner to inactivate transmission gate 81 and to prevent the transfer of video picture signals from the digital-to-analog converter 76 to the F.M. modulator 83. Switch 82B, which is mechanically coupled or connected to switch 82A, is also operated to a preview position, disenabling the OR circuit 45 and thereby terminating the passage of motor drive signals to the tape drive motor 53 and preventing the movement of the tape past the heads during the preview operation. If it decided that the visual information presented to the viewing screen of the monitor 79, which is held in memory 70, is to be recorded, a record switch 107, such as a momentary contact normally open switch, is manually depressed which activates a pulse generator 108 which sets a latch 109 which activates one input of an AND gate 110. The AND gate 110 generates a control signal on its output when both its inputs are activated, the other of said inputs extending from the recording amplifier 67. The output of the AND gate 110 is a clock pulse which is passed to an OR gate 111 which is connected to a flip-flop switch 112, the $\overline{Q}$ output of which subsequently becomes activated allowing the tape drive motor 53 to be operated when the OR gate 45 is also activated. The $\overline{Q}$ output of the flip-flop 112 also activates a time delay circuit 82D which, after suitable time delay sufficient to allow the motor 53 to attain running speed from starting and the recording of the frame code as described, activates transmission gate 81 passing the video signals to be recorded therethrough to the record heads. When the $\overline{Q}$ output is activated, the $\overline{Q}$ output of the flip-flop switch 112 is inactivated. When the next sync pulse, during the single frame mode of recording, is received from the amplifier 67, the flip-flop switch 112 switches causing the $\overline{Q}$ output to become inactive and preventing the passage of video signals to the modulator 84 and the motor drive signals to the tape motor 53. The $\overline{Q}$ output is then reactivated creating a pulse on the output of a pulse generator 113 which is applied to reset the latch 109 readying it for the next recording cycle. In the motion picture mode, the preview operation may be attained in a manner similar to that in which the preview operation was effected for previewing the single frame output of the video camera with the exception that the AND gate 114 is deactivated by the debounce circuit 44 and the $\overline{Q}$ output of flip-flop switch 112 activates the OR gate 111 preventing a change of state of the input to the flip-flop switch 112 during the changing output of the AND gate 110 until the manual switch 43B is released and inactivates the debounce circuit 44 and also the AND gate 114 so as to allow passage of the next clock pulse from the AND gate 110 through the OR gate 111 to the clock input of the flip-flop 112 when the described toggling and reset functions are effected.

MOTION PICTURE PLAYBACK MODE

The motion picture playback mode may be effected when the switch 51 containing the contact pairs denoted 51A, 51B, 51C and 51D is in the motion picture playback position and the normally open momentary contact switch 115 is actuated without a code being set up in the coded switches 95. The switch 115, when so operated, activates a pulse generator 116 which sets a latch 117 activating OR gate 45 starting the tape drive motor 53 as described. The tape then travels past the record-playback head assembly 54 in a manner to permit the playback head or heads 56 to scan and pick up the recorded signals and to transfer them through the electronic head switching means 85, operating in reverse to the described recording note, and switch closed 51C to the F.M. demodulator 118, the output of which is a composite video picture signal representative of the composite video picture signal recording so reproduced, which composite signal is fed to a sync separator 119 which serves to separate the sync signals from the composite video signal and present same on an output 120 while the video picture signal elements separated from the reproduced composite video picture signal are passed on a second output 121.

The sync signals generated on the output 120 are passed to the reference generator 48 through switch 51A and define the means whereby synchronization is effected between the movement of the tape and the rotation of the head assembly 54 to insure proper head position with respect to the transverse recording tracks of the tape. The video picture signals generated on the output 121 are transmitted to the analog-to-digital converter 68 and are converted to digital codes representing the brightness and color levels of the picture elements making up the frames of the video information. The write-enabling means is thus continually activated in the motion picture playback mode by the proper operation of a bistable switch 122 through OR gate 46. The operation of the memory 70 and its associated circuitry for controlling the monitor 79 is effected, as described, under the recording mode of operation wherein the output 121 of the sync separator 119 is substituted for the picture signal output of the television camera. In this mode of operation, a control track reproduction head 61 reproduces the recorded signals from the control track of the tape and passes same through a switch 51E to playback amplifier electronic circuitry 123 of conventional design and to the reference signal generator for subsequent application to the tape drive motor 53, as previously described, to maintain the operation of said motor in synchronization with the recordings provided on the tape.

The audio signals generated by the playback circuit of the audio reproduction head 89 in scanning the recordings of the audio track of the magnetic recording member of the recording unit 24 are passed through switch 51D to conventional playback-amplifying electronic circuits 124 to which is connected a speaker 125 supported by the housing 11 of the portable unit 10 to accompany the motion picture video information reproduced from the magnetic recorder and displayed on the monitor.

SELECTIVE SINGLE FRAME PLAYBACK

In order to effect the reproduction of selected full-frame video picture signals from the recording unit 24, a selection code is generated by the selective operation of the bank of code generating switches 95, the output of which extends to a code comparator circuit 126. Switch 115 is manually closed and when the frame location of the magnetic tape containing the selected frame is driven into alignment with the reproduction heads, a decoder 132 senses the code signals reproduced from the frame code recordings on the magnetic tape adjacent the selected frame after they are amplified by means of the control track playback electronic circuitry 123 and when the code so generated matches the code generated on the outputs of the bank of switches 95, the output of the code comparator 126 becomes activated setting a latch 127 which effects energization of the write-enable input 74 to the memory 70, as described, through OR gate 46. The output of latch 127 extends to one input of an AND gate 128, the other input of which extends from the output 120 of the sync separator 119 which is activated with the reproduced video information at the beginning of the reproduction of the recording of the selected full-frame video picture signal causing the AND gate 128 to transfer a clock pulse to the JK or flip-flop switch 129, the output Q of which becomes inactive. Upon the subsequent generation of a sync pulse and its application to the AND gate 128 at the end of the reproduction of the selected frame, said AND gate creates a second clock pulse for the flip-flop switch 129 causing the Q output thereof to be reactivated, which causes a pulse generator 130 to generate and transmit a pulse to the reset input of latch 127, thus deactivating said latch and its control devices (e.g., OR gate 46 and AND gate 128).

Memory 70 and monitor 79 are operated as described for the motion picture mode and the monitor is thus energized to display the selected video picture signal information as a still image on its display screen in accordance with the recording thereof in the memory 70. The code comparator 126, when activated, also operates to reset latch 117 a time delay thereafter as determined by the time delay element or circuit 131 having a delay interval which is sufficient to permit the playback of the entire selected full-frame video picture signal reproduced from the magnetic recorder and said time delay element operates to deactivate the tape drive motor when the selected frame has been reproduced and applied as described. The image information contained in the selected full-frame video picture signal is thus displayed as a still image and may be retained for an extended period of time until another frame of image information is similarly reproduced and applied to the monitor or the motion picture mode of operation is selectively initiated or the power is turned off.

A number of alternative arrangements for the system provided in FIG. 5 are noted. For example, although a four-head magnetic tape recording and reproduction unit is illustrated in the drawings, any other video tape, video card or video disc recording means may be employed embodying suitable circuit and control changes therein as required to effect the described operations. Video picture signal synchronization signals may be derived by means other than that illustrated and described, such as by means of crystal oscillators, electromechanical means, microminiature pulse generating circuits, etc.

Other forms of monitoring devices, such as charge coupled devices, may be utilized to replace the cathode ray tube monitor 79 and should they contain digitizing circuits, it may be possible to eliminate the analog-to-digital and the digital-to-analog devices employed in the circuit diagram so as to simplify the electronic circuitry presented and described.

It is also noted that the memory 70, which is provided herein as a RAM or read-write memory may also comprise any suitable type of memory such as a serial shift register, a charge coupled (CCD) device, a magnetic bubble memory, a rotating disc or drum or any other type of pulse signal storage device capable of storing at least a million bits of full color, high resolution, single frame picture information wherein the appropriate circuit modifications to operate such memory would be provided.

An alternative means for storing single frame video picture signals may comprise a solid state memory 133 which may be connected, as shown, by means of pluggable contacts denoted 136, 137, 138 and 139. For recording, such memory 133 is connected to receive the video signal at the output of transmission gate 81 by means of a plug contact 138. A recording enabling signal may be generated and applied to the memory 133 from the control input to the transmission gate 81 through a contact 139. Synchronization may be provided for the memory by means of the sync signals generated on the output of amplifier 67 through a plug contact 137. Operation may be effected as described.

In order to effect playback of the single frame video picture signal in such a mode of operation, the memory is connected to the socket contacts 136–139. Since the recording input contact 139 is not energized due to the deactivation of the transmission gate 81 no video picture signal will be present at the contact 138. Synchronization may be provided, as described, through contact 137 and the video picture signal output of the memory is passed through a contact 136 to the analog-to-digital converter 68 through switch 51B and is thereafter subsequently displayed as in the described reproduction playback mode. In such modes of operation, the memory may retain its information in storage even after the tape is disabled or removed from the unit. Such a memory may comprise a static programmable serial type of memory.

It is noted that the coded switches 95 may include or be replaced by an automatic code generator for generating a different code in a progression of codes to be recorded along with each still picture video signal recorded to permit the selective playback of the video signal from the recorder at a future time as described for selectively viewing the still picture represented thereby.

Modified forms of the apparatus of FIG. 1–5 are noted as follows:

I. If is is desired to transmit the outputs of either or both the television camera 32 and video recorder/reproduction unit 24 to a remote receiver such as a video monitor, a short wave transmitter may be provided in housing 11 and connectable, through suitable manually operate bistable switching means, to either the output of the video recorder 24 or the camera 32 to transmit via short wave to said remote receiver whichever signals are generated by the camera or recorder (e.g.-single full frame video picture signals or motion picture video picture signals). Such signals may be generated as described by the operator of the unit 10 actuating the described switches or, in another mode of operation, generated under remote control by employing a short wave receiver in the housing 11, the output of which is connected to coded relays or logic circuits responsive to respective control codes transmitted thereto from a short wave transmitter at the monitor and generated when the operator thereof selectively closes code generating switches. Transmission of said video signals may also be effected by means of closed circuit television means employing a flexible cable connected to the outputs of the television recorder 24 and camera 32, preferably by being coupled to a connector at the bottom of the handle 19 as described. Remote control of both the camera and recorder 24 as set forth in FIG. 5 may also be effected by direct remote wire connection through said cable to the various control devices described.

II. A magnetic tape, card, disc, solid state or bubble memory recording unit may supplement or replace the unit 24 in the housing 11 and may also be connected as illustrated in FIG. 5 by means of wires extending through a flexible cable to the camera, monitor, battery,-microphone, speaker and control switches supported by or within the housing 11. Such recording-reproduction unit may be contained, for example, in a harness or strap held retainer which is held on the belt or shoulders of the operator of the camera and may be operated as described by means of the control switches supported by the housing 11 and/or by means of similar control switches supported by the housing for the recorder and reproduction unit.

III. In yet another embodiment, it is noted that the recorder and reproduction unit 24 supported within the housing 11 may be operable to receive and record single frame and/or motion picture television signals from a remote camera by employing either a short wave receiver for such signals within housing 11 and having its output connected to suitable code responsive controls for the recorder 24 or direct wire connection via cable connected to the handle 19 to said controls.

IV. If the recorder and reproduction unit 24 is a magnetic card reader-reproducer magnetic disc recorder-reproducer, suitable receiving means for magnetic cards or discs may be employed wherein such record members are inserted into slotted openings in the top wall 12 or either of the side walls of the housing to bring them into operable engagement with mechanisms for conditioning the for recording and reproduction operations as described. Storage space for such cards or discs may be provided in the housing adjacent the battery or recorder 24.

Added to the circuits FIG. 5 either in parallel with the coded switches 95 or as a replacement therefore may be an automatic code signal generator for generating a progressive binary code each time a single full frame video picture signal is generated by camera 32 and recorded so as to provide a different code recording with each full frame video picture signal recording to permit the selective reproduction of full frame video signals as described VI. It is also noted that the camera 32 employed in the hand held unit 10 of FIGS. 1-3 or in a system employing such camera and a separate videocassette recorder connected thereto for recording the output of the camera, may also contain an image converter tube or other form of image converter for convert-video picture signals generated in scanning phenomena at a low light intensity to signals which may be applied in the manner described, to both the visual monitor screen and the recorder unit which signals have been so modified by the image converter that the images generated therefrom may be easily monitored and discerned or studied. Such image conversion means may be employed to provide suitable images during either the single frame recording and monitoring or the motion picture mode of operation of the recorder and monitoring subsystems.

VII. Various videocassette recording and reproduction mechanisms and supporting circuitry as described may be employed in the portable camera, recording and playback unit 10 of FIGS.1-4. Magnetic recording and playback apparatus found in such video-cassette recorder-player units as the Betamax SL-3000 and other videocassette recording units made by Sony Corporation of Tokyo, Japan; the 2200 VCR, the VR 1000PW and other videocassette recordin units manufactured by Matsushita Electroc Co.,Ltd. of Tokyo, Japan; the VP-7300 manufactured by Akai of Japan contain magnetic tape recording and reproduction transducing means and cassette take handling means which may be employed in a unit of the type shown in FIGS. 1-4 and/or modifications thereof.

It should be understood with respect to the circuit diagrams defined in FIG. 5 of the drawings and described above that suitable power supplies having correct polarities and connected to be energized by the described rechargeable battery or a source of line current are provided where not included in the drawings so as to supply proper electrical energy for appropriately operating the various illustrated circuits as described in the specification.

What is claimed is:

1. A portable television camera, recorder and playback unit comprising in combination:
   (a) a housing,
   (b) a television camera supported within said housing and having an input for light derived from image fields to be scanned by said camera, which input is located at the front end of said camera,
   (c) means secured to said housing permitting hand holding and directing said housing such that said input to said camera may be directed by a person whose hand is supporting said housing by engagement with said hand gripping means to aim said housing to permit said television camera to scan a select portion of the image field in front of said housing,
   (d) said television camera having a video signal output and means for operating said camera to cause it to full-frame scan the image field presented to said input to said camera and to generate full-frame video picture signals of the image information received, on said output,
   (e) first control means including a first manually operated switch for causing said television camera to full-frame scan the image field presented to said camera when said first switch is closed, said first switch being accessible to the hand of a person holding said camera with said hand gripping means,
   (f) a video monitor supported by said housing and including a viewing screen which is viewable by a person holding said hand gripping means and operatively directing said housing while operating said camera to scan the image field presented to said camera when so operatively directed,
   (g) second manually operable control means including switching means for selectively connecting said monitor with said video signal output of said camera,
   (h) a video recorder and reproduction unit supported within said housing immediately adjacent said television camera and a magazine containing a magnetic record member operatively and removably retainable in said recorder and reproduction unit,
   (i) said video recorder and reproduction unit having a recording transducing means for recording video signals output by said television camera on said magnetic record member and reproduction transducing means for reproducing video signal recordings from said magnetic record member,
   (j) third manually operable control means supported by said housing for controlling said video recorder to record and selectively play back information recorded on said magnetic record member,
   (k) fourth manually operable control means supported by said housing for selectively connecting said monitor to either the output of said television camera or the output of said video recorder to permit said monitor to display picture information derived directly from said camera or from said reproduction transducing means of said video recorder.

2. An apparatus in accordance with claim 1 including a speaker and a microphone supported by said housing, said microphone being operable to receive sounds in the vicinity of said housing and to output audio signals of said sounds and means for recording the audio signals on said record member of said video recorder, means for selectively reproducing said audio signals as said video recorder operates and reproduces recorded video signals from said record member and means for presenting audio signals reproduced from said record member to said speaker to allow a person using said video recorder to listen to reproductions of the audio recordings received from said video recorder.

3. A system in accordance with claim 2 including speech signal processing and analyzing means supported within said housing for recognizing select words of speech spoken into said microphone and operable for controlling said fourth control means in accordance with selected words of speech spoken to selectively control said camera and said video recorder.

4. A portable television camera, recorder and playback unit in accordance with claim 1 including an audio microphone supported by said housing for receiving and converting sounds received thereby to audio electrical signals, and means for amplifying said audio electrical signals and recording the audio information defined thereby on said magnetic record member adjacent the video picture signals output by said television camera and recorded thereon.

5. A portable television camera, recorder and playback unit in accordance with claim 1 wherein said magnetic record member is in the form of a sheet of magnetic recording material, such as a card, and said video recorder and playback unit are operable to receive, record on and play back video picture signals from parallel tracks of said sheet.

6. A portable television camera, recorder and playback unit in accordance with claim 1 wherein said magnetic record member is a magnetic tape and said recorder and playback unit is operable to record on and play back information with respect to said magnetic tape, said magnetic tape being wound in a magazine, and said housing is operable to receive and preposition a magazine containing magnetic tape in said recorder and playback unit to permit video picture signals output by said camera to be recorded on the tape of said magazine and to be played back therefrom when said fourth control means is manually operated.

7. A portable television camera, recorder and playback unit in accordance with claim 1 wherein said video monitor is mounted to provide a view of said viewing screen to a person whose eyes are directed towards the front end of said housing to permit said person to view both the image phenomena in front of said camera and the video image generated by said television camera.

8. A portable television camera in accordance with claim 1 including means for controlling the operation of said video recorder and reproduction unit to cause it to generate single frame video picture signals and to apply same to said monitor to generate selected still images of recorded video signals reproduced from a magnetic record member operatively located in said video recorder.

9. The television camera apparatus of claim 1 additionally comprising solid state memory means, said solid state memory means having the capacity for storing signals corresponding to at least a full-frame video picture signal.

10. A video recording and reproduction apparatus comprising in combination:
a support,
hand grip means for holding said support,
a video camera supported by said support and operable to receive light from a field to be scanned in a given direction when said support and said camera are operatively held by said hand grip means,
manually operable control means supported adjacent said hand grip means and including a first switch closable by a finger of the hand holding said hand grip means,
said first switch being operatively connected for the operation of said video camera when closed by the finger of the hand holding said camera,
a video recorder including rotary video transducer means supported by said support adjacent said video camera and connectable to receive picture signals output by said camera,
motor means for operating said video recorder,
control means for controlling the operation of said video recorder including:
(a) first control means for controlling the operation of said motor means in a first driving mode to operate said video recorder in a recording mode, said first switch being operatively connected to said first control means for activating, when closed, said first control means and causing said video recorder to record video motion picture signals output by said video camera,
(b) second control means including a second switch supported by said support for controlling said video recorder selected video picture signals output by said video camera of the image field scanned thereby when said second control means is activated,
(c) said second control means being operable, when said second and said first switches are simultaneously closed to record motion picture signals output by said video camera,
(d) said second control means including a manually operable switch supported by said support for controlling said video recorder to record select single frame video picture signals output by said video camera as determined by the image field scanned thereby when said second control means is activated,
(e) said second control means being operable, when said second switch and said first switch are simultaneously closed, to permit the operation of said video camera to effect either the recording of multiple sequential frames of motion picture video picture signals output by said video camera over an extended period of time or of single select frames of video picture signals on a record member of said video recorder.

11. A television camera apparatus comprising:
a support arrangement including holding means enabling an operator to hold said support arrangement in a determined orientation,
a television camera mounted to said support arrangement and including an optical lens system directed in a first direction with respect to said support arrangement, and means for producing first video signals on the output of said camera responsive to a scene toward which said optical lens system is directed,
a video cassette recording system including rotary video transducer means mounted to said support arrangement rearwardly of said television camera, with respect to said first direction, said recording system including a receptacle arrangement enabling the operable reception and removal of a video cassette therefrom, an electrically operated video display means having a display screen mounted to said support arrangement and responsive to video signals received thereby for generating a visual image and means for displaying said image to the operator of said apparatus in such a manner that said image may be viewed by said operator when the eyes of the operator are directed in said first direction, and control means including means for selectively applying said first video signals to said video display means to preview recording and to said first video display means and said recording system for recording, said control means additionally including means for selectively applying video signals to said electrically operated video display means from said recording system, said video display means being fixedly mounted to said support arrangement whereby said operator may view images generated on said display screen and produced by video signals which are either generated on the output of said camera or reproduced from said recording system.

12. The television camera apparatus of claim 11 wherein said apparatus is portable and said display screen is mounted rearwardly of said camera.

13. The television camera apparatus of claim 11 wherein said apparatus is portable and said display screen is mounted at the rear of said support arrangement.

14. A television camera apparatus comprising:

a support arrangement including holding means enabling an operator to hold said support arrangement in a predetermined orientation, a television camera mounted to said support arrangement and including an optical lens system directed in a first direction with respect to said support arrangement, and means for producing first video signals in response to light received from a scene toward which said optical lens system is directed and passed through said optical lens system, a video cassette recording and reproducing system including rotary video transducer means mounted to said support arrangement, said recording and reproducing system including a receptacle arrangement enabling the operable reception and removal of a video cassette therefrom, an electrically operated video display means having a display screen mounted to said support arrangement, said display means being responsive to video signals for displaying an image that can be viewed by said operator when the eyes of the operator are directed in said first direction, a source of synchronization signals, and means for applying said synchronization signals to said camera and display means, and a control circuit including:

a first switch having a first position connected to direct signals from the output of said camera to said display means, and via frequency modulating means to said recording system, and a second position connected to direct the output of said recording system, via frequency demodulating means to said display means, and means for applying video signals produced by said television camera to said electrically operated video display means without a recording thereof to allow a preview function.

15. The television camera apparatus of claim 14 wherein said recording and reproducing system includes a transducer head assembly and a drive means therefor, said apparatus further comprising a reference signal generator for said drive means, and an electronic timing means, said first switch further comprising means controlling said reference signal generator by means of said timing means in said first position and means controlling said reference signal generator with the output of said frequency demodulating means when said switch is in said second position.

16. The television camera apparatus of claim 14 wherein said recording and reproducing system comprises a control signal recording head, said apparatus further comprising means for recording control signals generated by said reference generator when said switch means is in said first position and means for synchronizing the operation of said reference signal generator with signals output by said control head in said second position of said first switch means.

17. The television camera apparatus of claim 14 wherein said recording and reproducing system comprises a control signal reproduction head, said apparatus further comprising code generating means, means for recording the output of said code generating means when said control switch is in said first position, a source of reference code signals, and means for comparing the signals output by said control signal reproduction head with said reference code signals when said switch is in said second position.

18. The television camera apparatus of claim 14 further comprising a preview switch and a recording switch, said preview switch having a first position for enabling application of the output of said camera to said recording and reproducing system via said first switch and a second position inhibiting the application of the output of said camera to said recording and reproducing system, said recording switch being connected to override the function of said preview switch in its second position to permit the application of the video signal output by said camera to said recording and reproducing system.

19. The television camera apparatus of claim 14 wherein said recording and reproducing system comprises a head drive means and a capstan motor and a mechanism for driving a video tape, said apparatus further comprising a reference signal generator for controlling the operation of said head drive means, a gate for passing control signals from said reference signal generator to a drive means for controlling said capstan motor, a second switch, and means responsive to operation of said second switch for closing said gate to enable the operation of said capstan motor.

20. The television camera apparatus of claim 19 further comprising a control circuit connected to enable application of the output of said camera to said recording and reproducing apparatus only when said second switch is operatively activated.

21. The television camera apparatus of claim 20 further comprising a preview switch, and circuit means responsive to operation of said preview switch for inhibiting the operation of said capstan motor.

22. A portable television camera apparatus comprising:

a support arrangement including holding means enabling an operator to hold said support arrangement in a determined orientation, a television camera mounted to said support arrangement and including an optical lens system directed in a first direction with respect to said support arrangement, and means for producing first video signals in response to light received by said optical lens system from a scene toward which said lens system is directed, a video cassette recording and reproduction system including rotary video transducer means mounted to said support arrangement rearwardly of said television camera, with respect to said first direction, said recording system including a receptacle arrangement enabling the operable reception and removal of a video cassette therefrom, an electrically operated video display means having a display screen mounted to said support arrangement and responsive to the receipt of video signals for displaying an image that may be viewed by said operator when the eyes of the operator are directed in said first direction, and control means including means for selectively applying said first video signals to said video display means to preview recording and to said first video display means and said recording and reproduction system for recording, said control means additionally including means for selectively applying video signals generated either by said television camera or by said recording and reproduction system to said video display means.

* * * * *